INVENTOR.
ELIAS BURSTEIN
BY
Alfred C. Hill
AGENT

INVENTOR.
ELIAS BURSTEIN
BY Alfred C. Hill
AGENT

INVENTOR.
ELIAS BURSTEIN
BY Alfred C. Hill
AGENT

United States Patent Office 3,201,708
Patented Aug. 17, 1965

3,201,708
CONTINUOUS OPERATION TWO LEVEL D.-C. PUMPED MASER AMPLIFIER WITH SEMICONDUCTOR INTERFACE

Elias Burstein, Narberth, Penn Valley, Pa., assignor to International Telephone and Telegraph Corporation, Nutley, N.J., a corporation of Maryland
Filed Sept. 8, 1960, Ser. No. 54,802
4 Claims. (Cl. 330—4)

This invention relates to electromagnetic wave amplifiers and more particularly to an improved electromagnetic wave amplifier of the maser type.

The term "maser" is an acronym for "microwave amplification by stimulated emission of radiation." The process of amplification by a maser depends on the existence of discrete energy levels in a medium. In general, distribution of electrons among the possible energy levels in a medium in a condition of thermal equilibrium is such that the populations of any two states satisfy the Boltzman condition expressed by the general equation:

$$N_2=N_1e^{\frac{-E}{kT}} \quad (1)$$

where $N_2$ is equal to the number of particles per unit volume in the state of higher energy and $N_1$ is equal to the number of particles per unit volume in the state of lower energy when the system is in thermal equilibrium, E is equal to the difference in energy between the two states, $k$ is equal to the Boltzman constant ($1.4\times10^{-16}$ erg/deg. K) and T is equal to the absolute temperature in degrees Kelvin of the system of particles. Accordingly, in an atomic system higher energy levels are less populated than the lower energy levels. There will be an exchange of electron population between the energy levels when electromagnetic waves having a frequency related to the energy difference between two particular energy levels is applied to the medium. The relationship between the electromagnetic wave frequency and the energy difference between the two energy levels is expressed by Planck's equation, $$f=\frac{E_1-E_2}{h} \quad (2)$$

where $h$ equals Planck's constant, $f$ equals the frequency emitted in the transition between the two energy levels, $E_1$ equals the energy of the higher energy level and $E_2$ equals the energy of the lower energy level. A certain fraction of the electron population in the lower energy level will absorb radiation and be raised to the higher energy level and an equal fraction of the electron population in the higher energy level will be stimulated to emit radiation and will drop to the lower energy level. In thermal equilbrium, when there is a greater electron population in the lower energy level, the electromagnetic wave upon interaction with the medium gives up energy which is gained by the medium to increase the electron population of the upper level at the expense of the population of the lower level. The net result would be an absorption of energy by the medium from the electromagnetic wave. On the other hand, if there is provided a medium in which for a finite time an upper energy level has a more dense electron population than a lower energy level, there can be net emission, that is, incident electromagnetic waves having an operating frequency properly related to the difference in energy of the energy levels will during this finite time cause more power of the operating frequency to be radiated than absorbed resulting in amplification of the electromagnetic waves.

Accordingly, in order to amplify eelctromagnetic waves, there must be provided a medium in which the electron population of the upper energy level is greater than that of the lower energy level, that is, there will be an inversion of electron population between the energy levels of the medium. However, such a distribution of electron population is not in thermal equilibrium and effectively exhibits a negative temperature characteristic. Several methods have previously been utilized to obtain the inversion of electron population between energy levels in a medium.

One such method is called a two level maser. A medium having two energy levels is cooled to a temperature of a few degrees above absolute zero, such as in a bath of liquid helium, so that when thermal equilibrium is established most of its electrons fall into the lower of the two energy levels. In order to invert the population ratio, the medium is subjected to a pump signal in the form of a high powered microwave pulse which briefly raises electrons to the higher energy level and thereby places the medium in an excited state. While in this excited state the medium acts as an amplifier for a weak microwave signal having a frequency properly related to the difference in energy levels and equal to that of the pump signal. The energy amplification obtained is intermittent, since the required condition for maser amplification, the excited state, lasts only a short time after the pump pulse. After the pump pulse the medium slowly returns to thermal equilibrium through a relaxation process, that is, the lower energy level is once again more densely populated. Besides the inherent intermittent operation of this type of two level maser, it is very impractical as an amplifier since operating time is usually a small fraction of the recovery time.

Another method of obtaining the population inversion and also overcoming the disadvantage of the intermittent operation of the above described two level maser is called the three level maser. This type of maser employs three energy levels. The medium is cooled as in the two level maser so that at thermal equilibrium a large difference in population between all three energy levels is established. An alternating current (A.C.) pump signal is coupled to the medium to provide an inverted electron population between at least two of the energy levels. For instance, the A.C. pump signal raises electrons from the lowest energy level to the highest energy level in a manner resulting in an equal, electron population in these levels. Under this condition either the highest energy level will have a greater electron population than the intermediate energy level, or the intermediate energy level will have a greater electron population than the lowest energy level, depending on the energy of the intermediate energy level. Amplification of electromagnetic waves having a frequency corresponding to the difference in energy levels between the intermediate energy level and the upper energy level, or between the lower energy and the intermediate energy level, depending on which pair of levels exhibits the inversion of population, can now take place. Under these these conditions, continuous amplification of an electromagnetic wave is possible since electrons can be "pumped" to the highest energy level from the lowest energy levels to maintain the medium in a continuously excited state while the electromagnetic waves are simultaneously amplified by the electrons being stimulated to return from a higher level to a lower level. While it is true that the three level type maser gives continuous amplification, a pump signal having a microwave frequency higher than the electromagnetic waves being amplified is usually employed. This results in complex and costly equipment and a restriction on the operating frequency of the maser. A maser of this type cannot be extended into the submillimeter wavelength region (far infrared frequencies) due to the requirement that the pump signal frequency must be higher than the signal being amplified, since present-day oscillators are not capable of generating signals in the submillimeter wavelength region.

Accordingly, an object of this invention is to provide a novel electromagnetic wave amplifier of the maser type providing continuous amplification of electromagnetic waves and eliminating the heretofore generally employed source of A.C. pump signals.

A feature of this invention is the provision of a solid state, two energy level maser comprising a body including an inverted spin state semiconductor having a negative or abnormal *g*-factor and a material having a positive or normal *g*-factor disposed in a tight, close fitting, substantially continuous contacting relationship to provide an interface therebetween, and a D.C. pump source coupled in shunt relation to the solid, the polarity of the signal of the D.C. source or the material selected as the inverted spin state semiconductor determining the operating frequency range of the maser. The selection of a given material as the inverted spin state semiconductor and as the positive *g*-factor material for a particular operating frequency range will enhance the operation of the maser in the particular frequency range.

The symbol *g* and the term "*g*-factor" employed in the specification and claims have reference to the spectroscopic splitting factor and is equal to 2.0023 for free electrons and is analogous to the Landé splitting factor of atomic spectroscopy. The term "*g*-factor" is at times also referred to as the magnetic splitting factor since the energy splitting is accomplished by a magnetic field.

The above-mentioned and other features and objects of this invention will become more apparent by reference to the following description taken in conjunction with the accompanying drawings, in which.

Figure 1:
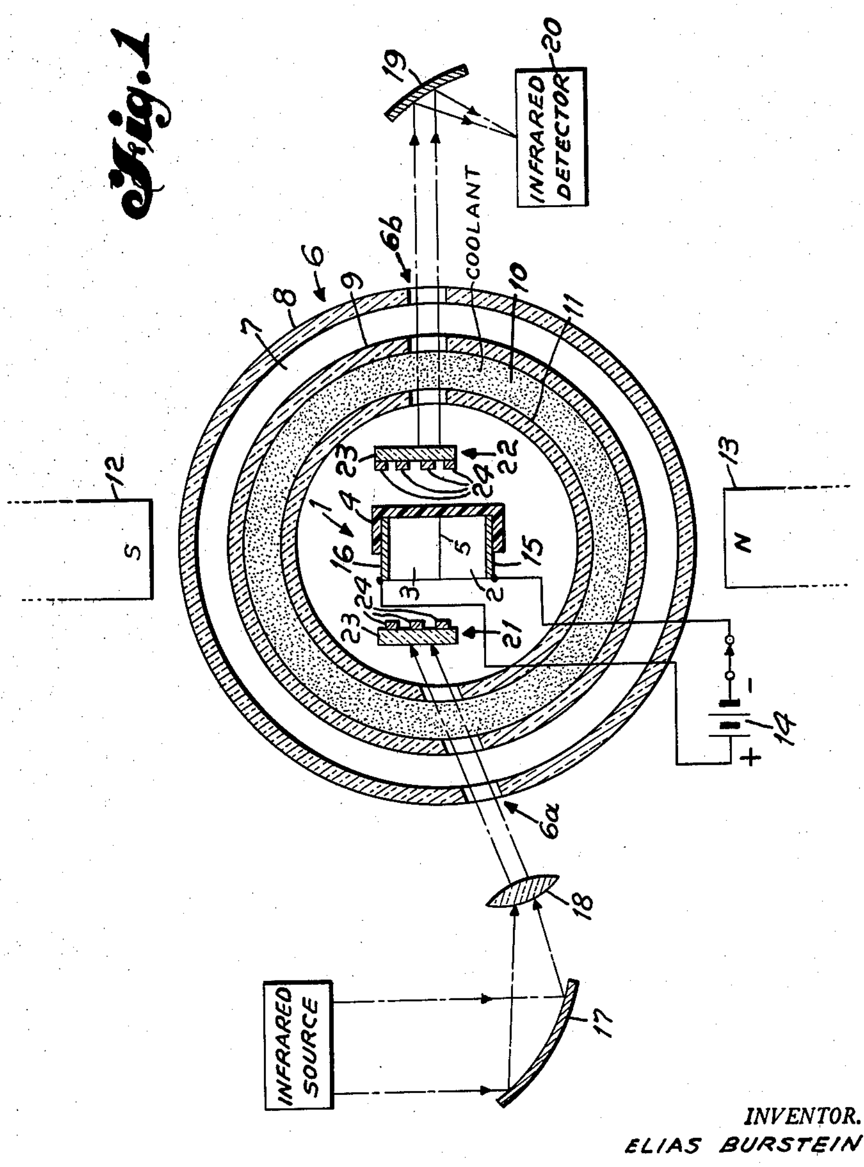
FIG. 1 is a schematic illustration partially in cross-section of an amplifier for electromagnetic waves in the infrared frequency range in accordance with the principles of this invention.

Before discussing in detail specific embodiments of this invention, the general principles applicable to this invention leading to the choice and configuration of materials necessary to obtain the required inversion of the electron population with its accompanying negative temperature, for amplification by stimulated emission will be briefly outlined. The electromagnetic wave amplifier of this invention utilizes the paramagnetic resonance of the spins of conduction electrons in solids. Consider an assembly of free electrons placed into a magnetic field. The field removes the spatial degeneracy of the electrons causing the spins to line up either parallel or anti-parallel to the magnetic field in an energy spaced relation. In other words, the conduction-electron spin states are separated into two Zeeman substates or sublevels. The energy difference between these two orientations of spins is given by:

$$\Delta E = ugH \qquad (3)$$

where $u$ is the Bohr magneton $0.927 \times 10^{-20}$ erg/gauss, $g$ is the magnetic splitting factor defined hereinabove and H is the magnetic field in gauss. As was pointed out hereinabove, $g$ is equal to 2.0023 for free electrons and has nearly the same value for conduction electrons in metals and in most semiconductors. However, theoretical predictions have established the existence of large, negative *g*-factors in certain semiconductors which have high mobility and low effective mass. This implies two things about the electron energies in a magnetic field. First, the energy gap ΔE is directly proportional to the magnitude of $g$ and H. However, there is a practical limitation which precludes extending the strength of the magnetic field beyond a certain point. From Planck's equation, it is also seen that the energy gap is directly proportional to the frequency of electromagnetic radiation involved in the energy transition between the two levels. A large *g*-factor would substantially increase the separation of energy levels in a material and, consequently, the frequency of electromagnetic radiation. Secondly, the sign of the *g*-factor determines the relationship of the energy levels of the spin orientation as follows. Each of the Zeeman sublevels is characterized by a spin quantum number $m$ of magnitude ½; the sign of this quantum number is positive if the direction of the spin angular momentum is parallel to the applied field and negative if anti-parallel. For a positive *g*-factor material, the lower energy level has $m = -\frac{1}{2}$ corresponding to a spin direction anti-parallel with the applied field. For a negative *g*-factor material, however, the lower energy level has $m = +\frac{1}{2}$ corresponding to a spin direction parallel to the applied magnetic field. Hence, in a semiconductor having a negative or abnormal *g*-factor, called an inverted spin state semiconductor, the spins parallel to the applied field are decreased in energy in the presence of a magnetic field relative to their value in the absence of a magnetic field and reside in the lower energy level resulting in an inversion of the energy levels of the two possible spin orientations as compared to the positive *g*-factor material.

When material forming an atomic system is in thermal equilibrium, the usual distribution of electron population of the spin levels is present, that is, there is an excess of electrons in the lower energy state regardless of whether the material has a negative or positive *g*-factor. The proportion of spin population between the upper and lower energy levels can be derived from Equation 1 above and is expressed as follows:

$$\frac{N_1}{N_2} = e^{\frac{-(E_1 - E_2)}{kT}} \qquad (4)$$

where $E_1$ equals the energy in the upper energy level and $E_2$ equals the energy in the lower energy level, $E_1 - E_2$ being equal to E of Equation 1. Now T can be defined by this equation as:

$$T = -\frac{(E_1 - E_2)}{k \log_e \frac{N_1}{N_2}} \qquad (5)$$

The numerator of Equation 5 is always positive because energy level $E_1$ is defined to be greater than $E_2$. Under normal circumstances, that is, at thermal equilibrium, $N_1$ is less than $N_2$, and the natural log term of Equation 5 is negative, giving a value for T greater than zero. If on the other hand, there is a population inversion providing a greater number of electrons in the upper energy level than in the lower energy level, that is, $N_1$ is greater than $N_2$, the denominator of Equation 5 would be positive, thereby giving a negative temperature T. Thus, when the desired inversion of the electron population between the upper and lower energy levels occurs for amplification by stimulated emission, the temperature is said to exhibit a negative characteristic.

In accordance with this invention, the inversion of electron population is enhanced and the frequency of operation may be substantially increased by employing semiconductors having a large *g*-factor of the inverted spin state type in conjunction with a material having a positive *g*-factor. Employment of the inverted spin state semiconductor in combination with positive *g*-factor material enables the pumping of the excess electrons from the lower energy level of the positive *g*-factor material to the upper energy level of the inverted spin state semiconductor and, hence, provide the necessary inverted electron population in the semiconductor. The electron population ratio can be increased in this manner since the electrons are translated from a spin quantum level of one orientation in the positive $g$-factor material to a spin quantum level of the same orientation in the inverted spin state semiconductor so that the translated and resident electrons have the same spin orientation enabling an increase in population rather than a reduction due to spin cancellation. The large value of the $g$-factor and, hence, the energy level separation, enables the amplification of electromagnetic waves in the infrared frequency range as well as in the microwave frequency range.

In general, small effective masses and appreciable spin orbit interaction energy relative to the magnitude of the energy gap will lead to large negative values for $g$-factors. Large atomic number semiconductors (such as In Sb) also have small energy gaps and small effective masses for the electrons in the conduction band. In order for the above consideration to apply, it is necessary that the minimum of the conduction band and the maximum of the valence band occur at the center of the Brillouin zone.

Referring to FIG. 1, there is illustrated therein an exemplary embodiment of an amplifier following the principles of this invention for the continuous amplification of electromagnetic waves in the infrared frequency range. A solid in the form of body 1 including portions 2 and 3 when appropriately acted upon provides a multiple energy level system. In general, one of the portions 2 and 3 includes a normal $g$-factor material, $g$ equals a plus value, while the other of portions 2 and 3 includes an abnormal $g$-factor material, $g$ equals a negative value, that is, an inverted spin state material.

Portions 2 and 3 are connected together in a tight, close-fitting substantially continuous contacting relationship. One way of accomplishing the desired relationship is to grind and polish by optical means the surface of the material of portions 2 and 3 to be connected together to provide as smooth a surface as possible and then force these surfaces together under pressure by means of plastic clamp 4 to provide interface 5 between portions 2 and 3. Thus, clamp 4 acts to force the material of portions 2 and 3 to be in a substantially continuous contacting relationship and to provide a substantially air-tight interface 5. Clamp 4 also maintains portions 2 and 3 coextensive with each other at least at interface 5.

More specifically, body 1 in the embodiment of FIG. 1 includes a non-ferrous metal, such as copper (Cu), gold (Au), silver (Ag), cesium (Cs) and rubidium (Rd), as portion 2 having a $g$-factor between +1 and +2 and an inverted spin state semiconductor, such as indium antimonide (In Sb), indium arsenide (In As), gallium arsenide (Ga As), mercury telluride (Hg Te), mercury selenide (Hg Se), bismuth (Bi) and antimony (Sb) as portion 3 having negative $g$-factors. The material of each of portions 2 and 3 are substantially monocrystalline in nature.

Body 1 is disposed within dewar vessel 6 including an evacuated volume 7 between walls 8 and 9 and a volume 10 formed between walls 9 and 11 for a coolant. The coolant may be liquid nitrogen but preferably is liquid helium to cool body 1 to a very low temperature preferably in the vicinity of absolute zero. The cooling of body 1 is desirable in order to increase the ratio of populations between the lower and upper energy states for spin orientation. Another advantage achieved by the cooling is the reduction in each of portions 2 and 3 to a negligible amount the scattering of electromagnetic waves by the lattice waves or vibrations excited in a thermally agitated solid. Further, in accordance with Equation 4 above, the low temperature provides an appreciable gain in sensitivity for the maser. A magnetic field illustrated to be produced by pole pieces 12 and 13 establishes a magnetic field to orient spins of the conduction electrons in the energy levels of the material of both portions 2 and 3. Thus the magnetic field, as produced by pole pieces 12 and 13, establishes a multiple energy level system in body 1, two energy levels in the metal of portion 2 and two energy levels in the inverted spin semiconductor of portion 3 for each original energy level.

As was pointed out hereinabove, it is necessary to invert the electron population to permit amplification of electromagnetic waves by stimulated emission of radiation. The desired inversion of electron population is accomplished in accordance with this invention by driving energy having a constant, continuous intensity, such as the direct current (D.C.) voltage of battery 14, electrically connected to electrodes 15 and 16 fused to the outer end of the metal of portion 2 and the semiconductor of portion 3, respectively, by methods well known to those skilled in the art. Battery 14 is thus connected in shunt relation to body 1 to have the positive terminal connected to the semiconductor of portion 3 as is illustrated in FIG. 1. The electrical connections from the terminals of battery 14 to electrodes 15 and 16 are made by means of ohmic or non-injecting contacts. Thus, through means of a D.C. pump (battery 14) having its terminals connected as illustrated in FIG. 1 the desired increase of higher energy electron population and, hence, a negative temperature characteristic in the semiconductor of portion 3, is provided to enable continuous amplification of electromagnetic waves in the infrared frequency range by stimulated emission of radiation.

The infrared electromagnetic waves may be coupled into energy exchanging relationship with certain ones of the energy levels in body 1, the energy levels of the semiconductor of portion 3 in the infrared maser, to extract energy therefrom by a number of different optical arrangements. One optical arrangement is illustrated in FIG. 1 to include an antenna, such as reflecting parabolic mirror 17, which receives the infrared electromagnetic waves from some source and reflects it toward a lens system, illustrated as lens 18, to collimate the electromagnetic waves incident thereon into a beam for coupling into and stimulation of body 1 for amplification thereof when the electron population of certain of the energy levels of body 1 is in its unstable condition, that is, exhibiting a negative temperature characteristic. An appropriate "window" for infrared electromagnetic waves of course would be provided in dewar vessel 6 as indicated at *6a* and *6b*. Since it is not practical to place body 1 in a cavity, as is done in equipment operating in the microwave frequency range to render the microwave amplifier frequency selective, it is preferred that body 1 and the electromagnetic wave energy coupling be arranged to increase the effective path length of the waves through body 1 and, hence, render the infrared amplifier frequency selective. This may be accomplished by "multiple passing" of the infrared electromagnetic wave through portion 3.

One way of obtaining this "multiple passing" of the infrared electromagnetic waves is to carefully adjust the angle of incidence of the beam output of lens 18 to cause the formed beam to be reflected back and forth between the metallic wall of electrode 15 and the highly polished surface of the metal of portion 2 at interface 5. With proper adjustment and shaping of the optical system and portion 3 of body 1 and with proper illumination of portion 3, it would be possible to cause several thousand reflections between the two metallic walls formed by electrode 15 and the metal of portion 2 before emerging for collection by mirror 19 for reflection to an infrared detector 20, such as a Golay cell. The path length through the semiconductor of portion 3 of body 1 may further be increased by the employment of half-silvered mirrors 21 and 22 disposed relative to the semiconductor of portion 3 and the beam of infrared electromagnetic waves to cause the beam of electromagnetic waves not only to be reflected between the metallic walls formed by electrode 15 and the metal of portion 2 but also to be reflected between mirrors 22 and 21 a number of times prior to emerging from the amplifier for collection at mirror 19. Mirrors 21 and 22 each may be composed of a glass member 23 having coated thereon strips 24 of silver, the strips 24 having a width and spacing between adjacent strips to provide fifty percent or more of the mirror surface as a reflecting surface and the remaining percent as a light energy transmitting media. This determines the "Q" of the arrangement. The strips 24 on mirror 21 are disposed relative to the strips 24 on mirror 22 to enable the reflection of light between these two mirrors, electrode 15 and the metal of portion 2 for an increase in the number of times the infrared energy is passed through the semiconductor of portion 3. The strips are illustrated as being disposed in a horizontal relationship in FIG. 1, but there is no reason why these strips could not be disposed in a vertical relationship provided the fifty-fifty proportion of reflecting and transmitting surfaces is maintained to enable the coupling of infrared electromagnetic waves into the semiconductor of portion 3, reflection between mirrors 21 and 22 and transmission of infrared electromagnetic waves from mirror 22 to mirror 19. Thus, there has been described hereinabove a means supplying to and extracting from body 1 electromagnetic waves having a frequency in the infrared region proportional to the difference between the energy levels of the semiconductor of portion 3 when exhibiting a negative temperature characteristic.

Figure 2:
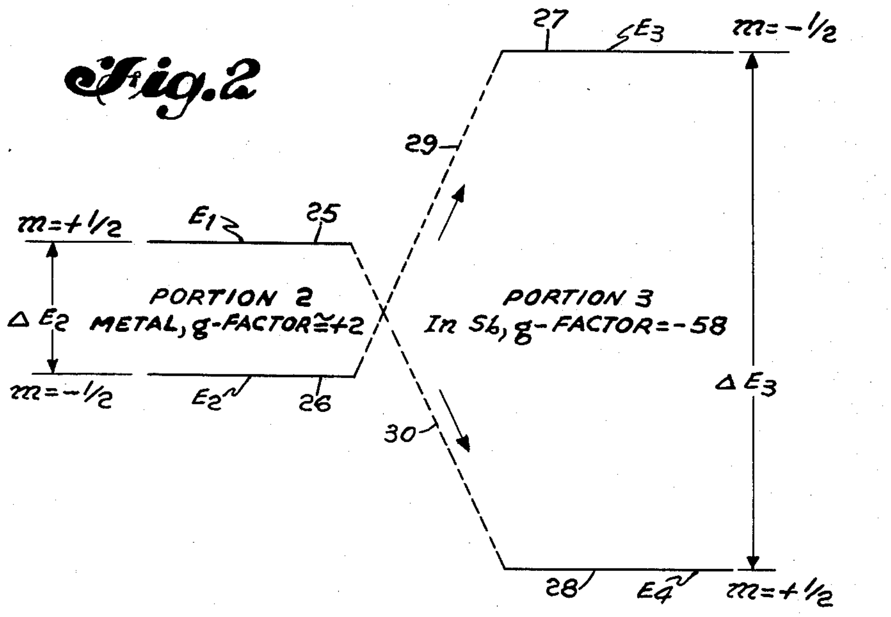
FIG. 2 is an energy level diagram helpful in explaining the operation of the amplifier of FIG. 1.

The operation of the infrared D.C. pump maser of FIG. 1 will be more clearly understood by referring to the energy level diagram illustrated in FIG. 2, where the material of portion 3 is indium antimonide having a g-factor equal to −58 and the material of portion 2 is one of the non-ferrous metals having a g-factor of +2. When body 1 is subjected to the magnetic field the conduction electron spin states of the metal of portion 2 and the In Sb semiconductor of portion 3 are separated into two Zeeman substates 25, 26 and 27, 28, respectively. It should be pointed out that the energy level diagram of FIG. 2 is only illustrative and is not meant to illustrate to scale the relative amplitudes of energy levels 25, 26 and 27, 28 since energy levels 27 and 28 of the semiconductor of portion 3 are spaced by an amount twenty nine times greater than energy levels 25 and 26 of the metal of portion 2. Also the diagram of FIG. 2 is not meant to illustrate to scale the relative relationship between energy levels 25, 26 and energy levels 27, 28; thus energy levels 25, 26 may actually be higher than or lower than illustrated. In fact, they may straddle one of the energy levels 27, 28. The electron spins of the metal of portion 2 which line up parallel to the applied magnetic field have a positive spin quantum number $m=+\frac{1}{2}$ and is raised in energy to the upper energy level 25 while the electron spins that line up anti-parallel to the applied magnetic field have a negative spin quantum number $m=-\frac{1}{2}$ and is depressed in energy to the lower energy level 26. In the indium antimonide of portion 3, it can be seen that the electron spins that line up parallel to the applied magnetic field have a positive spin quantum number of $m=+\frac{1}{2}$ and are depressed in energy to the lower energy level 28 while the electron spins which line up anti-parallel to the applied magnetic field and have a negative quantum number of $m=-\frac{1}{2}$ are raised in energy to the upper energy level 27. Thus, there is illustrated in FIG. 2 the inversion of the spin quantum number in the inverted spin state semiconductor of portion 3, said inversion being determined by the polarity of the g-factor as pointed out hereinabove. When body 1 is placed in dewar vessel 6 and cooled to a temperature approaching absolute zero, the electron population of the energy levels in body 1 line up in their stable condition, namely in the metal of portion 2, the largest population of electrons would be found in energy level 26 while in the semi-conductor of portion 3, the largest population of electrons would be found in energy level 28. Thus, we have the electron population in the metal of portion 2 and the semiconductor of portion 3 in their usual stable condition.

To obtain the necessary inversion of population for maser operation, battery 14, the driving energy source, is connected as illustrated in FIG. 1 to force the electrons in the metal of portion 2 to flow from portion 2 into the semiconductor of portion 3. Thus, the D.C. pump source, battery 14, causes the excess population in energy level 26 traverse through interface 5, as illustrated by dotted line 29, to the upper energy level 27 of the semiconductor of portion 3 and at the same time causes the electrons in the upper energy level 25 of the metal of portion 2 to traverse through inerface 5, as illustrated by dotted line 30, to the lower energy level 28 of the semiconductor of portion 3. If the lattice structures of the metal of portion 2 and the semiconductor of portion 3 are such that there are few induced spin transitions of the electrons at interface 5, the population ratio present in the metal of portion 2 will be transferred into the semiconductor of portion 3 and, hence, the electron population ratio in the semiconductor of portion 3 will be substantially inversely proportional to the original electron population ratio which existed in the metal of portion 2 prior to the pumping operation. This inversion of electron population ratio is possible since the metal contains a much greater quantity of electrons than the semiconductor of portion 3, and the addition of a relatively large number of electrons to a relative small number of electrons causes take on an electron population value substantially equal to the value of the larger number of electrons being forced into this material.

As illustrated in FIG. 2, portion 3 is formed from indium antimonide having a *g*-factor of −58 and portion 2 is formed from a metal having a *g*-factor of +2. This results in an energy separation $\Delta E_3$ of the Zeeman levels of the semiconductor of portion 3 which is twenty-nine times greater than the energy separation $\Delta E_2$ of the Zeeman levels of the metal of portion 2. Thus, the electrons being forced into the semiconductor of portion 3 from the metal of portion 2 gain energy in their travel from energy level 26 to energy level 27. This energy gain is provided by the source of D.C. driving energy, battery 14. As a result of the pump action, a greater population of electrons is now present in energy level 27 than is present in the lower energy level 28 of the semiconductor of portion 3 and is discussed hereinabove the semiconductor of portion 3 will exhibit a negative temperature characteristic due to the inversion of electron population. Since the D.C. pump source is a source of continuous, constant level energy, the desired inversion of electron population will be maintained as long as the magnetic field, the cooling apparatus and battery 14 are in operation. The maintenance of the inversion of the electron population in the semiconductor of portion 3 will thereby enable the continuous amplification of the infrared electromagnetic waves that are passed through the semiconductor of portion 3 by one of many optical arrangements, such as is illustrated in FIG. 1.

In constructing the amplifier of FIG. 1, body 1 would be formed from the specific material employed in the description of FIG. 2 and placed in dewar vessel 6. Volume 10 would be filled with liquid helium to cool body 1 to approximately 1.25 degree K. A magnetic field of approximately 20,000 gauss is then to be applied to produce the oriented spin states of the conduction electrons. Under these conditions, the energy levels 25 and 26 of the metal of portion 2 are separated approximately $4\times10^{-16}$ ergs. From this information it can be determined by employing Equation 4 above, the ratio of electron population in the metal of portion 2 as follows:

$$\frac{N_1}{N_2}=e^{-2.2}=0.11 \qquad (6)$$

or about one electron in energy level 25 to nine electrons in energy level 26. If battery 14 is connected as illustrated in FIG. 1, the conduction electrons of the metal of portion 2 would be forced across interface 5 into the semiconductor of portion 3 and provided that the conduction electrons encounter only smoothly varying crystal properties across the junction, the probability of lattice induced spin "flipping" or transitions would be greatly reduced. This can be accomplished by properly selecting the two materials for portions 2 and 3 to be monocrystalline in nature so that the difference in the lattice structure between the two materials would produce minimum flipping. Then, not only will the spread in energy between the two energy levels 25 and 26 of the metal of portion 2 be increased by the ratio of the magnitude of the g-factors of the semiconductor of portion 3 and the metal of portion 2, but the spin state ($E_1$) having the lower population in the metal of portion 2 will also have the lower energy in the inverted spin semiconductor of portion 3 due to the persistence of magnetic quantum number across the interface 5. Thus, it would be observed that $$\frac{N_3}{N_4}=\frac{N_2}{N_1}=e^{2.2}=9 \qquad (7)$$

where $N_3$ is the electron population of energy level 27 and $N_4$ is equal to the electron population of energy level 28. Thus, there are nine times as many electrons in the upper energy level 27 as in the lower energy level 28 which corresponds to an effective electron spin temperature of approximately —36 degree K. at a frequency of $1.7\times10^{12}$ cycles per second corresponding to a wavelength of 200 microns which are disposed in the far infrared frequency range. Thus, when infrared electromagnetic waves are coupled into body 1, as described in connection with FIG. 1, for interaction with the energy levels 27 and 28 of the semiconductor of portion 3, the electromagnetic wave acquires energy by stimulated emission of radiation from the semiconductor of portion 3 resulting in amplification of input electromagnetic wave energy.

The semiconductor materials presented hereinabove having negative g values are cited as examples and do not limit in any way the scope of this invention since infrared amplification can be obtained by employing any inverted spin state semiconductor in conjunction with a material such as a metal having a normal g-factor, in the order of +2. The infrared amplifier of FIG. 1 would find particular use for amplifying infrared frequency and the operating frequency may be controlled by adjusting the magnetic field producing the orientation of the spin states of the conduction electrons.

The D.C. pump maser described hereinabove is different than the previously known masers in that the D.C. pump maser operates upon the conduction electrons rather than the electrons more tightly coupled to the lattic arrangement of the crystal which the previous maser devices have utilized in their operations. Another advantage of the D.C. pump maser disclosed hereinabove is the ease in which the frequency range of the amplifier may be changed from microwave to infrared frequency region, the change in frequency range being accomplished merely by reversing the battery polarity to thereby obtain population inversion in portion 2.

Figure 3:
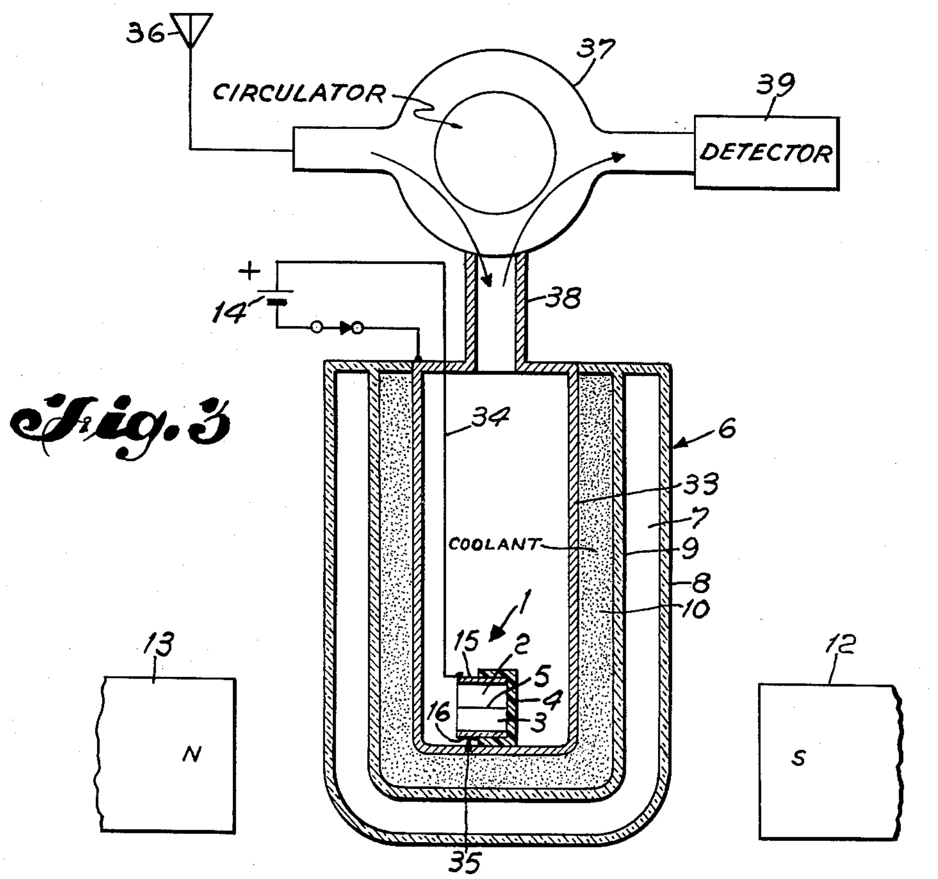
FIG. 3 is a schematic illustration of an amplifier for electromagnetic waves in the microwave frequency range in accordance with the principles of this invention.

Referring to FIG. 3, there is illustrated therein an arrangement following the principles of this invention incorporating components of the arrangement of FIG. 1 which are identified by the same reference characters as are employed in FIG. 1 for amplification of microwave frequencies. Referring to FIG. 3, there is illustrated therein a maser for amplifying electromagnetic waves in the microwave frequency region including body 1 having a +g material disposed in portion 2, such as silicon, and an inverted spin state semiconductor disposed in portion 3. As discussed hereinabove with respect to FIG. 1, the semiconductor of portion 3 and the +g semiconductor of portion 2 are disposed in a contacting relationship with respect to each other to form an airtight interface 5 between the semiconductor of portion 3 and the semiconductor of portion 2 by optically grinding the surfaces to be disposed in contact and maintaining the materials of portions 2 and 3 under pressure and in contact by means of clamp 4.

The body 1 is disposed in a magnetic field, such as provided by the illustrated pole pieces 12 and 13, to orient the conduction electron spin states in much the same manner as described hereinabove with respect to FIGS. 1 and 2. Body 1 is likewise placed in a dewar vessel 6 including a vacuum volume 7 disposed between walls 8 and 9 and a coolant volume 10 disposed between wall 9 and the metallic surface of waveguide resonant cavity 33 tuned to accept during operation electromagnetic waves having frequencies in the microwave frequency range. Body 1 is cooled in the dewar vessel 6 to obtain the advantages set forth hereinabove in the discussion of FIG. 1. A source of driving energy, such as battery 14, is coupled to electrode 15 through means of an insulated conductor 34 and to electrode 16 through means of the conductive wall of resonant cavity 33 and conductor 35. It will be observed that with this connection of the pump or driving source, battery 14, that the polarity of the battery has been reversed with respect to the connection to body 1 of FIG. 1. Namely, the positive terminal of battery 14 is connected through means of its associated electrode to the material having the positive g-factor in portion 2 rather than to the electrode associated with the inverted spin state semiconductor of portion 3 as illustrated in FIG. 1. As in the case of FIG. 1, the action of the pump source in the form of battery 14 is to bring about the necessary inversion of the electron population, that is, negative temperature characteristic, for amplification of electromagnetic waves which are in the microwape frequency range. However, rather than having the inversion of electron population present in the inverted spin state semiconductor of portion 3, the inverted spin population is now present in the material of portion 2 having the +g factor. The electromagnetic waves may be picked up on antenna 36 and coupled to resonant cavity 33 by means of circulator 37 and transmission line 38 so that the detected microwave signal will then be present in the properly tuned resonant cavity 33 to be supplied to body 1 for stimulation of the inverted electron populations in the semiconductor of portion 2 for amplification of electromagnetic waves. The electromagnetic waves, after being amplified by the semiconductor of portion 2, are extracted therefrom by resonant cavity 33, transmission line 38 and circulator 37. The extracted electromagnetic waves may then be coupled to detector 39, or other types of utilization devices.

Figure 4:
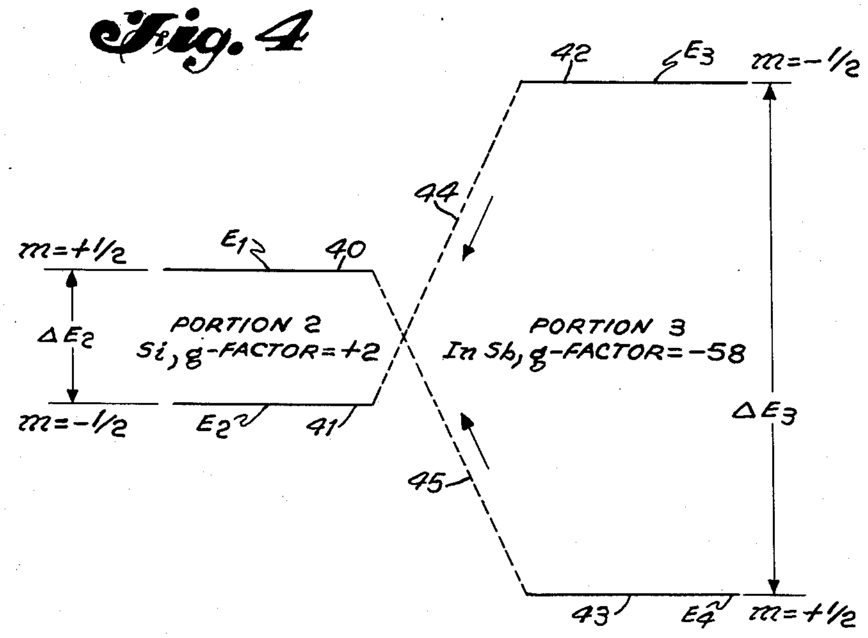
FIG. 4 is an energy level diagram helpful in explaining one mode of operation of the amplifier of FIG. 3.

In order to more fully understand the operation of the electromagnetic wave amplifier of FIG. 3, attention is directed to the energy level diagram of FIG. 4. Energy levels 40 and 41 indicate the higher and lower energy levels, respectively, of the +g-factor material of portion 2 such as silicon, when under the influence of the magnetic field for orientation of the spin quantum. Likewise, the energy levels 42 and 43 represent the orientation of the spin states of the conduction electrons in the inverted spin state semiconductor of portion 3, such as indium antimonide under the influence of the magnetic field. The resultant energy level diagram is similar to the diagram of FIG. 2 and has the same restriction as to scale as mentioned with respect to the diagram of FIG. 2. When body 1 is maintained in thermal equilibrium by the dewar vessel 6 there is present a more dense electron population in energy level 43 than there is in energy level 42 of the semiconductor of portion 3 and likewise the energy level 41 has a larger electron population than the energy level 40 of the semiconductor of portion 2.

Upon application of the D.C. pump energy to body 1, with the polarity as illustrated in FIG. 3, the electron populations of energy levels 42 and 43 are forced across interface 5, as illustrated by dotted lines 44 and 45. This will then dispose the more dense electron population of energy level 43 into the energy level 40 of the semiconductor of portion 2 and at the same time will dispose the electron population of energy level 42 of the semiconductor of portion 3 into the energy level 41 of the semiconductor of portion 2. If, as in the case of FIGS. 1 and 2, there are few induced spin transitions at interface 5, the population ratio present in the semiconductor of portion 3 during thermal equilibrium will be transferred essentially intact but in an inverted relationship into the semiconductor of portion 2. The energy separation $\Delta E_3$ between the levels 42 and 43 will now be decreased by a factor of twenty-nine. It should be further pointed out that at thermal equilibrium the number of electrons in the semiconductor of portion 3 may be made very much greater than the number of electrons in the semiconductor of portion 2 by proper doping and, hence, when the electrons are transferred from energy level 43 to 40 and from 42 to 41, the ratio of electrons in the semiconductor of portion 2 is almost inversely proportional to the ratio of electrons in the semiconductor of portion 3. Hence, this results in a population inversion, a negative temperature characteristic in the semiconductor of portion 2 and amplification of the microwave energy can now be obtained by an interaction between the semiconductor of portion 2 and the electromagnetic wave energy coupled into energy coupling relation with body 1 by antenna 36 and resonant cavity 33. As before, the frequency of operation is determinted by the separation of energy levels which is directly proportional to the *g*-factor and the magnetic field. Thus the operating frequency of the maser of FIG. 3 would be in the microwave frequency region since the energy level separation in the material of portion 2 has been decreased by a factor of twenty-nine relative to the energy level separation in portion 3 in the embodiment of FIG. 1. This reduction in energy level separation by a factor of twenty-nine results in a frequency region reduction of substantially twenty-nine and, hence, a reduction in operating frequency to the microwave frequency region.

Other variations are possible for the accomplishment of amplification of microwave energy. In place of indium antimonide in portion 3, it would be possible to employ any of the other inverted spin state materials mentioned hereinabove with respect to FIG. 1, such as indium arsenide having a *g*-factor of $-18$ and gallium arsenide having a *g*-factor of $-1.6$. Graphite or germanium could be substituted for the silicon of portion 2.

The cooling substance in the apparatus of FIG. 3 can be liquid nitrogen since the temperature of body 1 with the same applied magnetic field as in the infrared maser can be increased over that needed in the infrared amplifier by the ratio of the *g*-factors. Hence, it has been determined that the electron distribution in the order of 1 to 9 can be obtained by immersing the body 1 in a coolant having a temperature of 36 degrees K. which is equivalent to the temperature obtained by using liquid nitrogen as the coolant.

Figure 5:
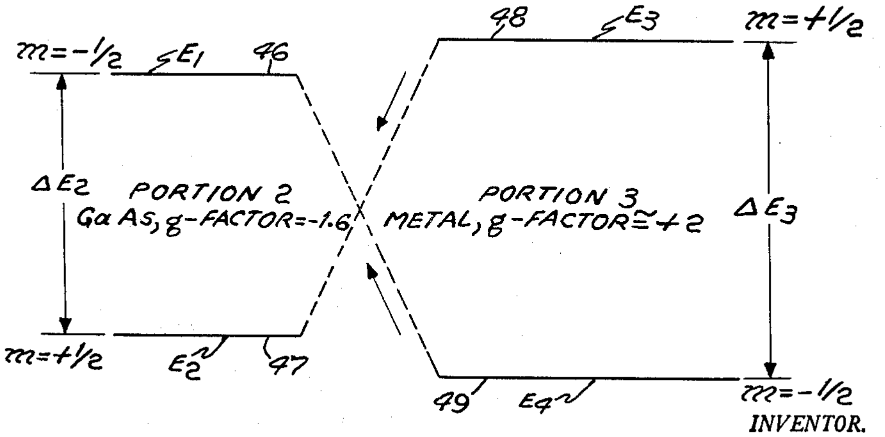
FIG. 5 is an energy level diagram helpful in explaining the alternative mode of operation of the amplifier of FIG. 3.

Referring to FIG. 5, there is illustrated therein an energy level diagram of the operation of an alternative embodiment for the microwave amplifier of FIG. 3 obtained by employing different materials for portions 2 and 3 of body 1. An inverted spin state semiconductor having a negative *g*-factor of $-1.6$, such as gallium arsenide, forms portion 2 and a metal having a *g*-factor of $+2$ forms portion 3 of FIG. 3. Then as indicated in the arrangement of FIG. 3 the inverted spin state semiconductor of portion 2 is connected to the positive terminal of the pump source 14 and the metal of portion 2 is connected to the negative terminal of the pump source 14. As in the previous arrangements the body 1 is operated upon by a magnetic field to produce the desired energy levels in each of the portions 2 and 3 of body 1 which as indicated in FIG. 5 constitute energy levels 46 and 47 for the gallium arsenide of portion 2 and energy levels 48 and 49 for the metal of portion 3. The operation of this maser after it has been placed in thermal equilibrium is such that the electrons are pumped from energy levels 48 and 49 of the metal of portion 3 to the inverted spin state levels of the inverted spin state semiconductor of portion 2, namely, energy levels 46 and 47. Since the metal contains more electrons than the inverted spin state semiconductor the upper energy level 46 of the gallium arsenide of portion 2 now contains the electrons originally present in lower energy level 49 of the metal of portion 3 and similarly the lower energy level 47 of the inverted spin state semiconductor of portion 2 now contains the electrons of the upper energy level of the metal of portion 3. Thus, since due to the highly conductive metal of portion 3 having more electrons than the semiconductor of portion 2, the electron population ratio which existed in the metal has now been transferred to and inverted in the gallium arsenide of portion 2 and thereby causes the gallium arsenide to exhibit a negative temperature characteristic. Amplification of the electromagnetic wave coupled into resonant cavity 33 by means of antenna 36 and circulator 37 is possible when the inverted spin state semiconductor of portion 2 is stimulated for emission provided the frequency of this electromagnetic wave is the proper value relative to the spacing $\Delta E_2$ between the energy levels 46 and 47.

The maser of this invention for use in amplifying microwave and infrared frequencies can be made to operate at any frequency from $10^{10}$ to nearly $10^{13}$ cycles per second and has several advantages over existing masers which operate only in the microwave frequency range. First, there is no need for a high frequency pump since the pump or driving energy is provided by a D.C. source. Second, unlike present two-level masers, the amplification is not intermittent, continuous amplification sensitivity is provided by the described method of population inversion. Third, but most important, is the temperature requirement for the amplifier of this invention in the microwave region. If $T_B$ is the temperature of the coolant, corresponding to the equilibrium temperature in the indium antimonide, then the effective spin temperature $T_e$ in the silicon is given by:

$$T_e = T_B \frac{g_{si}}{g_{InSb}} = \frac{-1}{29} T_B \qquad (8)$$

Thus, it is possible to obtain a population ratio of 9 to 1, as in the numerical illustration presented for the infrared device with reference to FIG. 1, at a bath temperature of 36 deg. K. instead of 1.25 deg. K. In fact, operation at the liquid nitrogen temperature (77 deg. K.) would yield an electron population ratio of about two to one in the silicon semiconductor which is adequate for most maser purposes. Therefore, the sign of the *g*-factor is used to obtain a population inversion in both the microwave and infrared form of masers and the magnitude of the *g*-factor is used to increase the frequency splitting for the infrared device while in the microwave device the large *g*-factor serves to reduce the effective operating temperature.

In the description hereinabove of the maser of this invention, electrons are injected by means of a D.C. source from a first material into a second material. Relaxation time, that is, the time necessary for the electrons to return to thermal equilibrium, plays an important part in the efficient operation of the above-described maser. The maser must be maintained in the negative temperature characteristic condition for amplification of a stimulating electromagnetic field. To accomplish this, the injected electrons must be removed from the second material before the body returns to thermal equilibrium. This can be accomplished by applying an electric field across the second material to sweep the electrons out. For this purpose, the transit time across the second material should be small compared to the relaxation time, that is, the time to return to thermal equilibrium.

The description hereinabove for purposes of explanation have been concerned with the production of inverted spin populations in discrete energy levels associated with the electrons in the conduction band of a material. It is also recognized that it is possible to produce inverted spin populations in the electrons associated with discrete energy levels of donor impurities. In this arrangement electrons are injected, or D.C. pumped into a p-conductivity type semi-conductor material strongly doped to a predetermined quantity with donor impurities. Under the appropriate conditions, the injected electrons will be captured by the ionized donor centers and the resulting spin level population of the neutral donor centers will reflect that of the injected electrons. There results in the maser of this type, in the case of silicon for example, a very long relaxation time. Thus, the problem of relaxation time has been substantially reduced.

While I have described above the principles of my invention in connection with specific apparatus, it is to be clearly understood that this description is made only by way of example and not as a limitation to the scope of my invention as set forth in the objects thereof and in the accompanying claims.

I claim:

1. An amplifier of electromagnetic waves comprising a body including a first material having a positive *g*-factor, a second material having a negative *g*-factor and an interface disposed between said first and second materials, said first and second materials each having two energy levels, a source of direct current voltage having one terminal connected to said first material and its other terminal connected to said second material for inducing energy transition from the energy levels of one of said materials to the energy levels of the other of said materials to cause said body to exhibit a negative temperature characteristic at a given frequency, and means supplying to and extracting from said body electromagnetic waves having said given frequency.

2. An amplifier of microwave signals comprising a body including a monocrystalline metal, monocrystalline gallium arsenide, and an interface disposed between said metal and said gallium arsenide, both said metal and said gallium arsenide having two energy levels, a source of direct current voltage having the positive terminal thereof coupled to said gallium arsenide and the negative terminal thereof coupled to said metal for inducing energy transition from the energy levels of said metal to the energy levels of said gallium arsenide to cause said gallium arsenide to exhibit a negative temperature characteristic at a given frequency in the microwave frequency region, and means supplying to and extracting from said gallium arsenide microwave signals having said given frequency.

3. An amplifier of microwave signals comprising a body including monocrystalline silicon, monocrystalline indium antimonide, and an interface disposed between said silicon and said indium antimonide, both said silicon and said indium antimonide having two energy levels, a source of direct current voltage, means to couple the positive terminal of said voltage source to said silicon and the negative terminal of said source to said indium antimonide for inducing energy transition from the energy levels of said indium antimonide to the energy levels of said silicon to cause said silicon to exhibit a negative temperature characteristic at a given frequency in the microwave frequency region, and means supplying to and extracting from said silicon microwave signals having said given frequency.

4. An amplifier of microwave signals comprising a body including monocrystalline germanium, monocrystalline indium antimonide and an interface disposed between said germanium and said indium antimonide, both said germanium and said indium antimonide having two energy levels, a source of direct current voltage, means to couple the positive terminal of said voltage source to said germanium and the negative terminal of said source to said indium antimonide for inducing energy transition from the energy levels of said indium antimonide to the energy levels of said germanium to cause said germanium to exhibit a negative temperature characteristic at a given frequency in the microwave frequency region, and means supplying to and extracting from said germanium microwave signals having said given frequency.

References Cited by the Examiner

UNITED STATES PATENTS

| | | | |
|---|---|---|---|
| 2,861,165 | 11/58 | Aigrain et al. | 317—239 |
| 2,909,654 | 10/59 | Bloembergen | 330—4 |
| 2,929,922 | 3/60 | Schawlow | 330—4 |
| 3,001,142 | 9/61 | Mims | 330—4 |
| 3,002,156 | 9/61 | Boyle et al. | 330—4 |
| 3,059,117 | 10/62 | Boyle et al. | 330—4 |

FOREIGN PATENTS 1,223,113 1/60 France.

OTHER REFERENCES

Pub: I Quantum Electronics, by Townes, published by Columbia University Press, May 5, 1960, pages 428 to 449.

"Advances in Quantum Electronics," Edited by Singer, 1961, Columbia University Press, New York, article by Lax, on pages 465–479.

ROY LAKE, *Primary Examiner.*

FREDERICK M. STRADER, KATHLEEN H. CLAFFY, BENNETT G. MILLER, *Examiners.*